May 9, 1961 J. E. THOMPSON 2,983,488
APPARATUS FOR HEATING BY STEAM
Filed Dec. 11, 1957

INVENTOR
John E. Thompson
BY
Holcombe, Wetherill & Brisebois
ATTORNEYS

United States Patent Office 2,983,488
Patented May 9, 1961

2,983,488
APPARATUS FOR HEATING BY STEAM
John E. Thompson, 908 Burns Drive, Flossmoor, Ill.
Filed Dec. 11, 1957, Ser. No. 702,077
1 Claim. (Cl. 257—314)

The present invention relates to a steam heating system designed to provide steam heat with various types of heat exchange equipment, such as steam kettles, steam driers, steam radiators, etc.

Heretofore steam has generally been used as a source of heat for industrial and domestic purposes. The principal disadvantage has been that steam under pressure produces a surface that is too hot for many purposes. This had led to over-heating and produces hot spots in industrial heating equipment, such as steam kettles.

It is the general object of the present invention to provide a system which is generally inexpensive to construct and does not require special equipment.

It is an object of the present invention to provide steam heating equipment which may be operated from ambient temperatures to 230° F.

It is also an object of the present invention to operate a steam heating system under positive flow control.

It is a still further object of the present invention to provide uniform heating under very low loads with an even distribution of the heat.

The various features of novelty which characterize this invention are pointed out with particularity in the claim annexed hereto and forming a part of this specification. For a better understanding of the invention, however, its advantages and specific objects obtained with its use, reference should be had to the accompanying drawings and descriptive matter in which have been illustrated and described a preferred embodiment of the invention.

Figure 1:
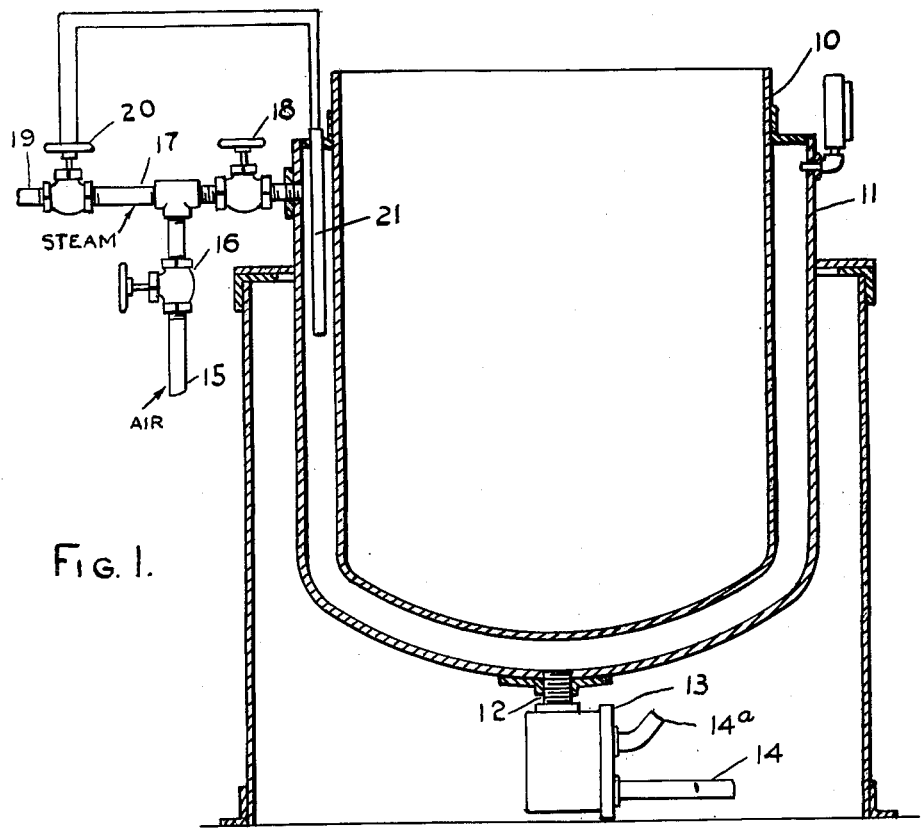
Figure 1 is a diagrammatic view in section of a steam jacketed vessel.

Referring to the drawings, like numerals identify similar parts throughout, and as will be seen from Figure 1, an embodiment of the present invention may comprise a steam kettle 10 of known construction having a steam jacket 11 surrounding the kettle. This steam jacket has the drain or exhaust 12 at the bottom thereof, which is connected to the steam trap 13 and having the air exhaust line 14a leading to the exhaust line 14. Air is admitted through the supply line 15, controlled by the valve 16, which may be of the manual type as shown, or be of a type to supply air at a constant pressure. This admits the air to the main supply conduit 16 and to the steam space between the jacket 11 and the kettle 10. A valve 18 is supplied to permit a positive shut-off of the system when it is not in operation. Steam is admitted through line 19 and controlled by the valve 20. This valve may be of the manual type, as shown, or it may be controlled by the thermostat 21 placed within the steam space between the steam kettle 10 and the steam jacket 11.

As as example of the operation of this device, the valve 16 is regulated to admit air at 15 lbs. per square inch pressure to the line 17, the valve 18 is opened and the valve 13 is so adjusted as to obtain the desired flow of air through the space between the kettle 10 and the surrounding jacket 11. Steam is then admitted to the air stream which causes an even heating of the kettle 10 due to the flow of air. The steam source may be of any convenient pressure such as 100 lbs. per square inch where the steam would have a temperature in the neighborhood of 340° F. The air is not heated prior to being brought into contact with the steam and the heat is transferred from the steam to the air, steam, mixture, and flows in heat exchange relationship with the kettle 10. This allows the use of steam to produce a heating of the kettle to a temperature substantially below those usually used with steam heated kettles, that is, the temperature from room temperature to 212° F.

The present system has the advantage of uniform heating at higher temperatures as well as at lower temperatures. This invention is not limited to heating within ranges of below 212° F., but may be used for heating to higher temperatures, such as 212° F. to 340° F., by simple regulation of the amount of steam that is admitted to the air stream.

The present system has the advantage of uniform heating at higher temperatures as well as at lower temperatures. This invention is not limited to heating within the ranges below 212° F., but may be used for heating to higher temperatures, such as 212° F. to 340° F., by simple regulation of the amount of steam that is admitted to the air stream. This has not been possible using steam kettles where the amount of heat withdrawn from the surface 10 by the contents of the kettle was small, and the present system avoids the production of hot spots and the resulting damage to the contents of the kettle.

The present system also has the advantages over the so-called vacuum steam heating systems where pressures below atmospheric are used to produce vapor having temperatures below 212° F. The obvious disadvantage of the vacuum steam heating system is the control of the flow of the heating fluid within the system. This disadvantage is overcome in the present invention by providing a positive control of flow of the heating fluid due to the constant flow of air.

Figure 2:
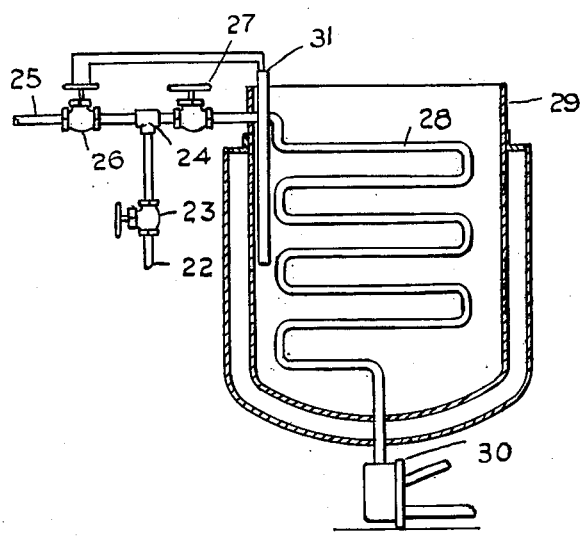
Figure 2 is a diagrammatic view in section of a vessel heated with a steam coil.

A second modification of this system is shown in Figure 2, wherein air is admitted through the supply line 22 and controlled by the valve 23 and flows to the main supply line 24. The steam is admitted from the steam line 25 and is controlled by the valve 26 and flows to the main supply line 24. The valve 27 controls the flow of steam and air to the heating coil 28 submerged within the kettle 29. The exhaust from the coil is controlled by the thermostat 31 to admit the proper amount of steam to heat the coil to the desired temperature. In the above example a steam trap has been shown. Any steam trap will work which will handle a steady flow of non-condensable gas such as air in addition to the steam and water contained therein.

While in the above embodiment of this invention steam has been used as the source of heat, and air at ambient temperatures has been used as a fluid to cause the steam to flow in the desired manner and to distribute the heat evenly over the heat transfer surface, other materials besides steam may be used, as will be apparent to one skilled in the art of heating. For example, hydrocarbon gases may be used in the place of air and may be circulated in the usual manner. Diphenyl or other materials may be used as a heat carrying medium in the place of steam, and these materials may be separated by the usual condensate separator, so that the condensate may be returned for reheating and the vapor recycled to carry the heated material into the heat transfer contact with the heat transfer mechanism.

While in accordance with the provisions of the statute the best forms of embodiment of this invention have been illustrated and described, it will be apparent to those skilled in the art that changes may be made in the form of the apparatus disclosed without departing from the spirit of this invention as set forth in the appended claim, and that in some cases certain features of this invention may be used to advantage without corresponding use of other features.

What is claimed is:

Apparatus for uniformly heating a heat sensitive material to within a predetermined temperature range, comprising: a kettle having a chamber to contain such material, said chamber being defined by a wall, an outer wall surrounding said chamber and forming between said walls a restricted passage having an inlet and an outlet, said passage being in heat exchange position relative to said chamber, means for supplying an intermittent flow of steam under pressure to said restricted passage, said means introducing said stream directly against said chamber wall and including a main pipe opening into said passage at its inlet and a branch pipe connected to said steam under pressure, and means for supplying a constant stream of air under pressure to the inlet of said restricted passage to convey said steam along said passage and produce an even heating of the walls of said passage over their entire length including a brench pipe connected to a source of air under pressure and also connected to said main pipe, and means for regulating the temperature of said mixture in said restricted passage, including a thermostatically controlled steam regulating valve in the steam branch pipe and a thermostat to control said valve disposed in the heat exchange position relative to said steam at its point of entrance into said restricted passage, whereby said steam supply is so controlled as to prevent superheating of the walls of said restricted passage at the point of entry.

References Cited in the file of this patent
UNITED STATES PATENTS

| | | |
|---|---|---|
| 48,839 | Rochow | July 18, 1865 |
| 627,120 | Jones | June 20, 1899 |
| 833,271 | Wentz | Oct. 16, 1906 |
| 1,150,439 | Link | Aug. 17, 1915 |
| 2,001,344 | Fielder | May 14, 1935 |
| 2,102,106 | Allen | Dec. 14, 1937 |
| 2,277,944 | Armstrong | Mar. 31, 1942 |
| 2,371,807 | Dalzell et al. | Mar. 20, 1945 |
| 2,703,224 | Robinson | Mar. 1, 1955 |
| 2,797,899 | Funk et al. | July 2, 1957 |
| 2,809,714 | Sims et al. | Oct. 15, 1957 |